June 17, 1924.  1,498,131
E. D. STINSON
AUTOMOBILE DIRECTION SIGNAL
Filed Nov. 6, 1920  2 Sheets-Sheet 1
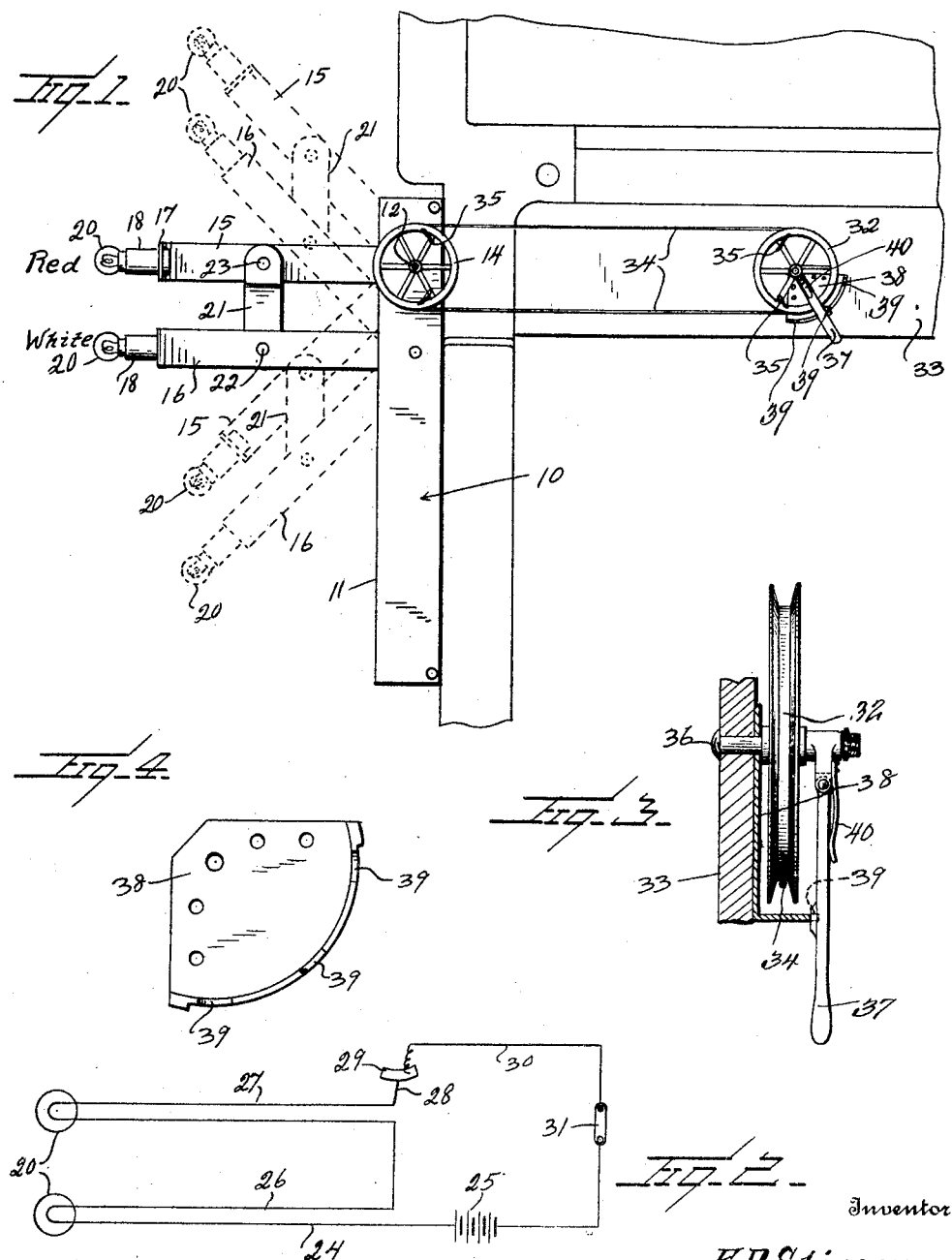
Inventor
E. D. Stinson
By Watson E. Coleman
Attorney

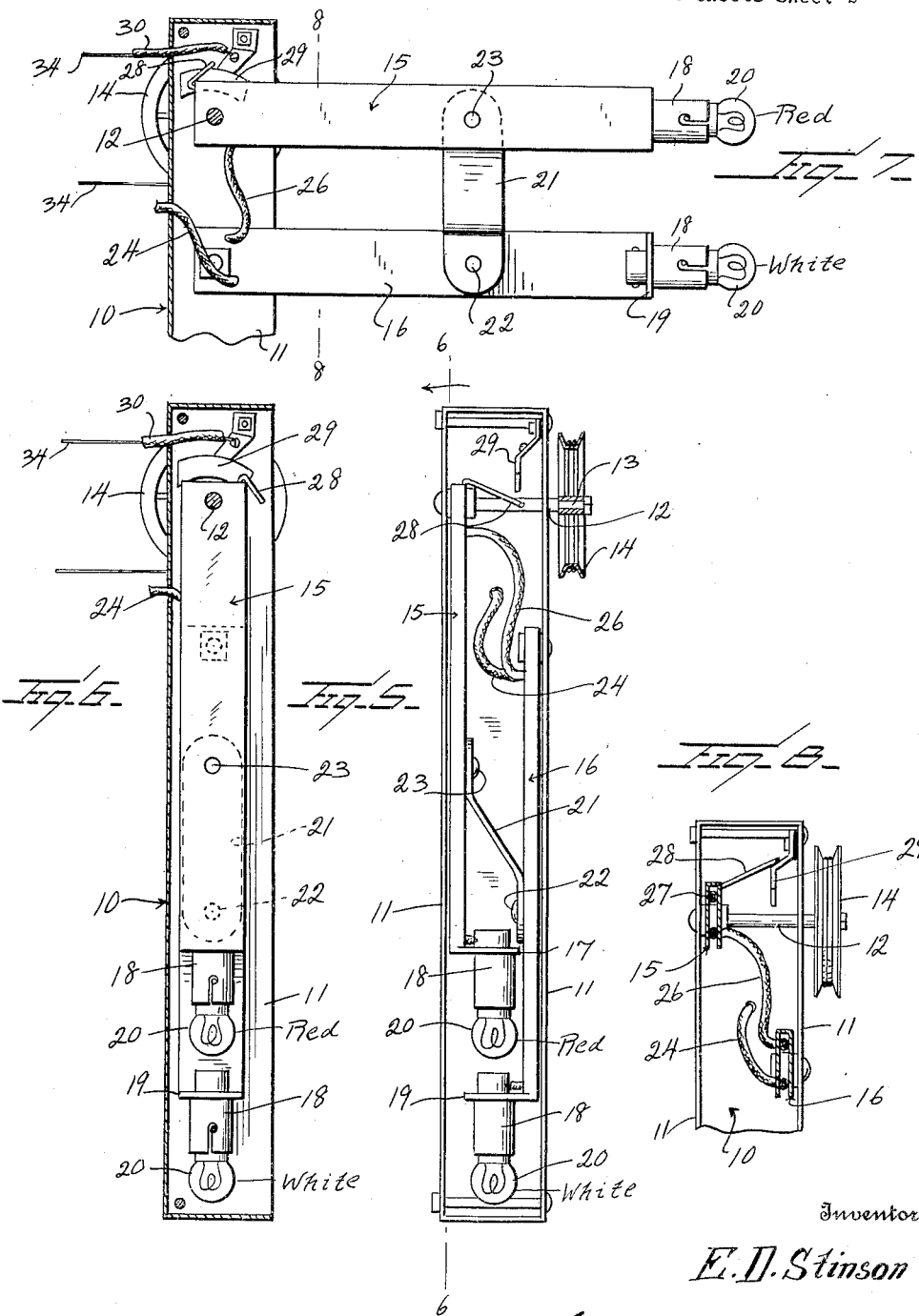

Patented June 17, 1924.

1,498,131

UNITED STATES PATENT OFFICE.

ETHEL D. STINSON, OF BISBEE, ARIZONA.

AUTOMOBILE DIRECTION SIGNAL.

Application filed November 6, 1920. Serial No. 422,299.

*To all whom it may concern:*

Be it known that I, ETHEL D. STINSON, a citizen of the United States, residing at Bisbee, in the county of Cochise and State of Arizona, have invented certain new and useful Improvements in Automobile Direction Signals, of which the following is a specification, reference being had to the accompanying drawings.

This invention relates to signalling devices, and more particularly to signalling devices for vehicles designed to indicate the direction in which the machine is about to turn, whereby following vehicles, pedestrians, and approaching vehicles may be properly warned in the same manner as is now secured by the signalling movements made by the arm of the driver of a car.

The general object of my invention is to provide a device of this character adapted to be mounted on one or both sides of the car and including a pair of semaphore arms normally disposed in a vertical position and encased, the arms being connected to each other to have parallel movement but being pivoted to the encasing housing, and provide means whereby said arms may be simultaneously shifted to a horizontal position or to a position diagonal with relation to horizontal and vertical planes, said arms being provided with electric lamps whereby the signalling device may be used at night.

A further object is to provide a device of this character having a signal light on each arm, the relative position of said lights indicating whether the arm is inclined downward and outward, disposed in a horizontal plane, or upward and outward.

A further object is to provide means whereby current shall be automatically switched to said lights as soon as the semaphore arms are shifted from an entirely inoperative, encased position to a display position and switched off of said lights when both of said arms have been turned into an encased or housed position.

A further object is to provide very simple means whereby the arms may be shifted and held in their shifted positions at the will of the operator.

Another object is to provide a device of this character which may be seen from the rear as well as the front of the car, and which may be readily applied to all makes of cars.

Other objects will appear in the course of the following description.

My invention is illustrated in the accompanying drawings, wherein:—

Figure 1 is a side elevation of my improved signal applied to a motor car and showing the instrument board thereof;

Figure 2 is a diagrammatic view of the wiring for the signal;

Figure 3 is a fragmentary sectional view through the instrument board showing the controlling lever and wheel;

Figure 4 is a plan view of the rack for the controlling lever;

Figure 5 is a front elevation of the housing for the signal showing the signal arms in their depending or retracted position;

Figure 6 is a section on the line 6—6 of Figure 5;

Figure 7 is a fragmentary side elevation showing the signal arms projected;

Figure 8 is a sectional view on the line 8—8 of Figure 7.

Referring to these drawings, it will be seen that the signal proper comprises a case or housing, designated generally 10, which has two side walls 11 and which is preferably closed at the top and bottom. This housing may be conveniently formed of sheet metal but may be of any suitable character. The housing is attached preferably to the left hand wall of the car adjacent the driver's seat, or a housing of like character may be disposed on both sides of the machine.

Passing through the housing adjacent its upper end is a shaft 12 which projects at one end through the wall of the housing and is reduced in diameter, as at 13, for the reception of the hub of a wheel 14 or equivalent member. Carried upon this shaft 12 and oscillating therewith is a semaphore arm 15, this semaphore arm being located adjacent one side wall of the housing and pivotally mounted upon the housing and against the other side wall and below the first semaphore arm is a semaphore arm 16. Both these arms are hollow and they may be conveniently made of sheet metal, the sheet metal being folded longitudinally of its length (see Figure 8) so that each arm is approximately U-shaped in cross section, the two side walls of each arm being held in proper spaced relation to each other in any suitable manner. One side wall of the upper arm 15 is angularly bent, as at 17, toward the plane of the arm 16, and this bent end is formed to provide or engage with a lamp socket or base of any suitable or desired form, this socket being designated 18. The arm 16 is constructed in the same manner as the arm 15, and one wall of the arm 16 is angularly bent, at its end, as at 19, toward the plane of the arm 15, and this angularly bent extremity carries a lamp socket 18 of the same character as the lamp socket 18 previously referred to. Within these lamp sockets are disposed the electric lights 20 of any suitable power, one of these lamps being preferably formed to display a red light and the other a white light.

The semaphore arms 15 and 16 are connected to each other for parallel movement by a link 21, which link is deflected laterally in its length, one end of the link being pivoted, at 22, to the arm 16, while the opposite end of the link is pivoted to one side wall of the arm 15, as at 23. Thus the two semaphore arms 15 and 16 will have parallel movement, and when the arms are shifted into a vertical position, both of said arms will be disposed within the housing 10, and when the arms are shifted to a horizontal position, they will be disposed in parallel horizontal relation, one above the other.

As illustrated in the wiring diagram in Figure 2 and Figure 8, a conductor 24 extends from a battery 25 or other source of current through the rear wall of the housing and into the space between the side walls of the arm 16 and along the arm 16 to the lamp base or socket 18. A return wire 26 extends longitudinally between the two walls of this arm 16 from the socket to the rear end thereof adjacent the pivot and out through an aperture in the side walls and through an aperture in the side wall of the upper arm 15, then along this upper arm 15 to the corresponding socket 18, and from this socket 18 a return wire 27 extends to the rear end of the arm and is electrically connected to a spring contact finger 28 which bears upon a segmental-shaped contact plate 29 mounted within but insulated from the housing 10. This contact plate is electrically connected by a wire 30 to the battery and preferably a switch 31 is disposed in the length of this wire 30 or in any other convenient portion of the circuit whereby the light may be initially turned on or off. This switch may form part of the general lighting circuit of the car so that when the headlights and taillight of the car are turned on, the signalling circuit will also be connected in circuit with the storage battery whereby the car is lighted.

Preferably, though not necessarily, sockets 18 will be provided of that type wherein the socket is formed with bayonet slots and the lamp base or plug provided with studs engaging the bayonet slots. I do not wish to be limited to this, however, as the particular construction of the sockets and lamp bases forms no part of my invention.

The mechanism for operating the semaphore arms to shift them from a retracted, concealed position to a display, projected position preferably consists of a grooved wheel or like element 14 mounted upon the shaft 12 as heretofore described, and a grooved wheel or like element 32 rotatably mounted upon the instrument board 33 of the car. The wheels 14 and 32 are connected by upper and lower cables or wires 34, each of which extends over half way around the wheel and is disposed in a groove in the periphery thereof and then extends through the rim of the wheel and is attached to one of the spokes, as at 35. Thus there is no slippage of this cable, cord or equivalent element upon these wheels 14 and 32. The wheel 32 is mounted upon a central pivot member 36, and mounted upon this shaft is a handle 37 which coacts with a plate 38 attached to the instrument board and having notches 39 on its periphery forming a rack. The handle 37 is urged into engagement with said notches by a spring 40 so that the handle and the corresponding wheel may be held in adjusted relation at any point desired. By releasing the handle from the notches of the plate 38, the handle and wheel may be shifted to thus shift the semaphore arm. Preferably the plate 38 will be provided with stops at its opposite ends limiting the movement of the handle from a position where the semaphore arms are vertical and encased within the housing to a position where the semaphore arms are projected to their full position.

With the signal constructed as before described, it is possible for the semaphore arms to be adjusted to take any of the positions usually taken by the driver's arm in indicating the direction in which the car is about to move. Thus the semaphore arms may be turned so that both of said arms point downward and outward. This will indicate that the machine is about to slow up or stop, for instance, or the semaphore arms may be turned to an absolutely horizontal position which will indicate a turn toward the left, or they may be shifted to an upwardly and outwardly extended position which will indicate a turn to the right, or the semaphore arms may be simply turned from a still to a horizontal position to indicate a turning movement on the part of the machine. Many States have a code of signals to be given by the driver's arm and to be indicated by the arm pointing downward and outward, horizontal, or upward and outward, and this device is entirely capable of being used to give the same set of signals as is ordinarily given by the driver's arm.

It is to be particularly noted that by the use of the two arms 15 and 16 with their different colored lights, a clearer signal as to the direction of the operator is afforded the following chauffeur by reason of the fact that there is no confusion between such signals and the tail light. If a single white or red light were used, the position of the same would mean very little to the driver of the approaching vehicle unless he actually saw the same move from the housing to the signalling position but where the two lights, particularly of different colors, are used, always remaining in parallelism, such confusion is avoided and the operator of the following vehicle is enabled to readily determine the moves which are intended to be made by the vehicle ahead. The contact finger 28 electrically engages the contact plate 29 just as soon as the arms move from their vertical and housed position so that so long as the arms are in their undisplayed or housed position, the lights will be out of circuit with the battery. Just as soon as the arms are moved out of the casing 10 at all they will be automatically connected in circuit with the battery and energized.

It will be seen that this mechanism is very simple, may be cheaply made, readily installed on any make of car, very light, and that it is thoroughly effective for the purpose intended. The wires are housed and protected so that there is no danger of the wires becoming broken or entangled, and at the same time the mechanism may be readily taken apart if it be desired to install new wires.

While I have illustrated a particular manner of shifting the semaphore arms, I do not wish to be limited to this, as it is obvious that many changes might be made therein without departing from the spirit of the invention.

I claim:—

1. In signaling apparatus of the type described, a housing, a plurality of semaphore arms pivoted within the housing upon pivots spaced longitudinally and transversely of the housing, the transverse spacing of the arms being greater than the thickness of the arms, the ends of the arms being provided with angular portions providing socket mountings for electrical signaling elements, and links having offset end portions connecting the arms and maintaining the same in sufficiently spaced relation to prevent engagement of electric elements carried by either of the arms with the other of the arms.

2. In signaling apparatus of the type described, a housing, a plurality of semaphore arms pivoted within the housing upon pivots spaced longitudinally and transversely of the housing, the transverse spacing of the arms being greater than the thickness of the arms, the ends of the arms being provided with angular portions providing socket mountings for electrical signaling elements, and links having offset end portions connecting the arms and maintaining the same in sufficiently spaced relation to prevent engagement of electric elements carried by either of the arms with the other of the arms, said arms being composed of sheet metal reverted upon itself to provide a U-shaped casing forming a housing for lead wires for the socket.

In testimony whereof I hereunto affix my signature.

ETHEL D. STINSON.